Feb. 6, 1951     L. A. ZACKO     2,540,564
FILTERING DEVICE
Filed Sept. 17, 1948
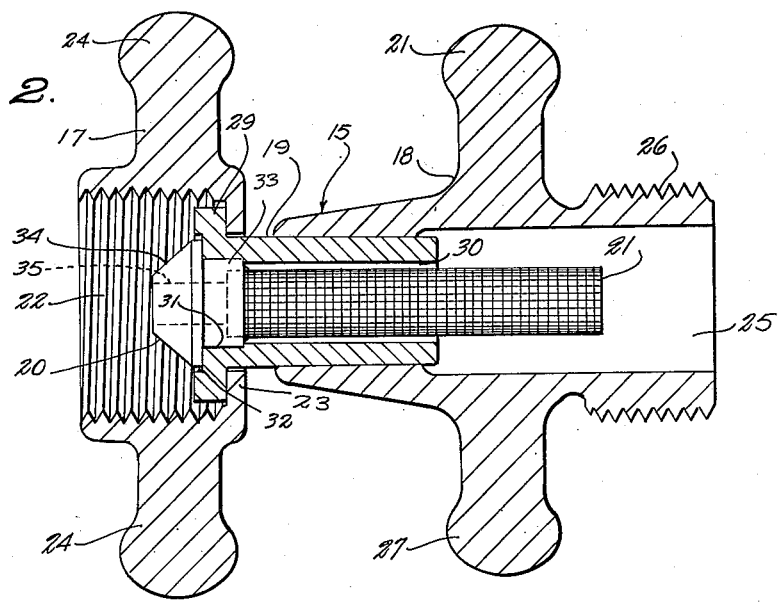
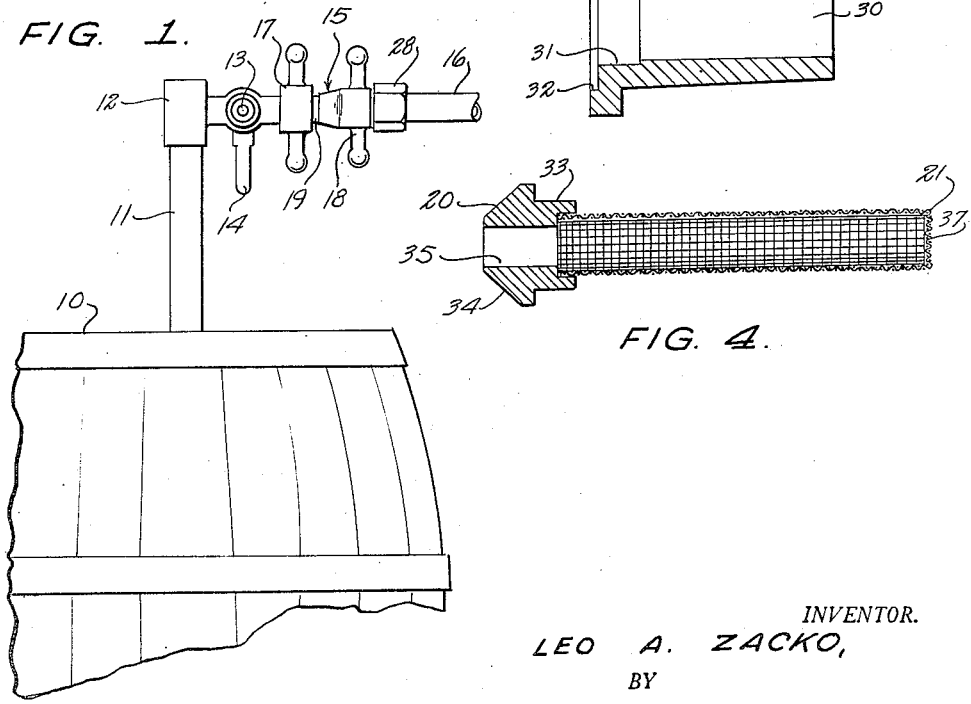
INVENTOR.
LEO A. ZACKO,
BY
McMorrow, Berman & Davidson
ATTORNEYS.

Patented Feb. 6, 1951

2,540,564

UNITED STATES PATENT OFFICE 2,540,564

FILTERING DEVICE

Leo Anthony Zacko, Pottsville, Pa.

Application September 17, 1948, Serial No. 49,763

1 Claim. (Cl. 210—164)

This invention relates to apparatus for tapping kegs containing charged liquid, such as beer, and more particularly to improved tapping apparatus including means for straining or filtering the liquid passing therethrough.

It is among the objects of the invention to provide improved container-tapping apparatus of simplified and economical construction, including a union which is easy to manually connect and disconnect, and in which a strainer is provided, insertable and removable at the union, so that it may be easily removed for cleaning, repair or replacement, and which is firmly held in operative position when said union is connected, and which apparatus includes a minimum number of simple parts, is neat and attractive in appearance, and easy to connect between a container, such as a beer keg, and a conduit leading to a conventional faucet.

Other objects and advantages will become apparent from a consideration of the following description and the appended claims in conjunction with the accompanying drawing, wherein:

Figure 1 is an elevation of a fragmentary portion of a container, such as a beer keg, showing tapping apparatus illustrative of the invention operatively installed thereon;

Figure 2 is a longitudinal, medial cross-section on an enlarged scale of the improved portion of the keg-tapping apparatus;

Figure 3 is a longitudinal, medial cross-section of a sleeve constituting an operative component of the improved apparatus, and illustrating certain details of construction; and Figure 4 is a longitudinal, medial cross-section of a strainer also constituting an operative component of the improved apparatus.

With continued reference to the drawing, there is illustrated in Figure 1, a container for charged liquid, such as a beer keg 10, having a conventional tapping pipe 11 extending therefrom which pipe is provided on its upper or outer end with an L-fitting 12 in which is installed a manually-operated, cut-off valve 13 of the plug type having an operating handle 14. The pipe 11 is installed in the keg by forcing it downwardly through a suitable keg opening, normally provided with a bung or stopper, the pipe forcing the bung or stopper out of the opening as the pipe is forced into the keg. The pipe 11 is forced into the keg with the valve 13 closed, and a union, generally indicated at 15, is then installed between the outer end of the valve housing and a conduit 16 leading to a conventional dispensing faucet.

The union assembly 15, as particularly illustrated in Figure 2, comprises a first union nut 17, a second union nut 18, a sleeve 19 secured in the second union nut and operatively engaged in the first, a screen plug 20 mounted in the sleeve, and a cylindrical screen 21 secured at one end to the screen plug 20 and extending circumspatially through the sleeve 19 and through a portion of the second union nut 18.

The first union nut 17 has a substantially cylindrical, hollow, central portion provided with internal screw threads 22 and with an internal annular flange or bead 23 at one end of the screw-threaded portion providing an annular shoulder adjacent the screw threads. Oppositely-disposed handles or knobs 24 project radially outwardly from the central portion to provide convenient means for turning the first union nut onto the externally screw-threaded outer end of the body of the valve 13.

The second union nut 18 has an elongated, generally cylindrical, central portion provided with a longitudinally-extending, concentric bore 25 and with external screw threads 26 near one end thereof. Oppositely-disposed knobs or handles 27 extend radially of the central portion of the second union nut at substantially the mid-length location of such central portion to provide a means for holding this second union nut against rotation while a suitable gland nut 28 is threaded on the external screw threads 26 to connect the conduit 16 to this second union nut.

At the end of the second union nut 18 opposite the external screw threads 26, the bore 25 is somewhat reduced in diameter, and provided with a slight taper and this tapered portion of the bore receives the sleeve 19, the sleeve being externally tapered to fit the tapered portion of the bore and is secured in the bore by suitable means, such as soldering or brazing, a taper of approximately .005" having been found suitable to provide a firm connection between the sleeve and the second union nut.

Sleeve 19 has on its end, extending out of the second union nut 18, an external, annular bead or flange 29 providing a radial shoulder which bears against the inner surface of the internal flange 23 of the first union nut, thus providing inter-engaging shoulders by means of which the sleeve inter-locks with the first union nut. In assembling the device, the sleeve is first inserted through the first union nut and then into the second union nut and soldered or otherwise secured in the second union nut, and operatively connects the two union nuts together. Sleeve 19 is provided with a concentric bore 30 extending therethrough and is provided in the flanged end thereof with a first counterbore 31 having a diameter only slightly larger than the diameter of the bore 30, and providing an annular shoulder at its inner end, and with a second, shallow counterbore 32 having a diameter materially larger than the diameter of bore 30.

The screen plug 20 comprises a cylindrical portion 33 received in the counterbore 31 and a truncated, conical portion 34 joined at its base to the corresponding end of the cylindrical portion 33 and having a base diameter greater than the diameter of the cylindrical portion to provide an annular shoulder around the plug at substantially the mid-length location thereof. The base of the conical portion 34 is received in the larger counterbore 32 of the plug to firmly seat the plug in the sleeve, and the conical portion 34 of the plug is received in the beveled outer end of the body of the valve 13, and provides a fluid-tight connection with the valve body when the first union nut 17 is threaded onto the outer end of the valve body.

The plug 20 has a concentric bore 35 extending therethrough and the end of this bore, at the outer end of the cylindrical portion 33 of the plug, is counterbored to receive one end of the cylindrical screen 21 formed of fine wire mesh, or other suitable material. Screen 21 has a diameter less that the diameter of the bore 30 of sleeve 19, and is held concentrically in the sleeve bore by the plug 20. Screen 21 has a closed end 37 so that all of the liquid passing from the container through the union 15 is forced to flow through the screen, which will remove any foreign objects from the liquid.

If the screen becomes clogged or dirty, it may be removed by simply turning the first union nut 17 off of the body of valve 13 and then grasping the screen plug 20 and withdrawing the entire screen assembly from the union, whereupon the screen may be cleaned and replaced for further operation.

The screen is of sufficient length to provide free passage of the fluid therethrough, and preferably extends entirely through the sleeve 19, and circumspatially through a portion of the bore 25 of the second union nut 18.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claim are, therefore, intended to be embraced therein.

What is claimed is:

A filtering device for use upon a keg having a tapping line provided with a valve, said device comprising a first internally screw threaded union nut for connection at one end with the discharge side of the valve and provided at its outer end with an inwardly directed radial shoulder having a central opening therein, a cylindrical sleeve housed at one end within the central opening of the shoulder and extending longitudinally outwardly of the shoulder for a substantial distance and having a bore extending throughout the entire length thereof, the sleeve being provided at its housed end with an annular radially outwardly extending flange disposed inwardly of and engaging the inner side of the shoulder of the first nut, the flange of the sleeve being provided in its inner side with a shallow recess arranged concentric to the bore in the sleeve, the periphery of the sleeve being slightly tapered longitudinally outwardly of the first nut, a plug mounted within the bore at the housed end of the sleeve and provided with an axial bore extending through it and provided at its inner end with an enlarged conically tapered head forming an annular shoulder seated within the shallow recess of the flange, the conically tapered head projecting longitudinally into the nut and spaced inwardly of the flange of the sleeve and the union nut for engaging a seat in the valve, an elongated cylindrical filter sleeve secured within the bore of the plug and extending through the bore of the sleeve concentric therewith and protruding beyond the outer end of the sleeve, the filter sleeve being spaced from the bore of the sleeve for forming an annular space between the sleeve and filter sleeve, and a second union nut frictionally fitted on the tapered periphery of the sleeve and disposed longitudinally outwardly and spaced from the first nut, the second union nut being externally screw threaded at its outer end for connection with the tapping line and having a tapered bore receiving the tapered periphery of the sleeve, the second union nut extending longitudinally beyond the outer ends of the sleeve and filter sleeve, the bore of the second union nut being enlarged outwardly of the outer end of the sleeve and adjacent to the portion of the filter sleeve extending beyond the sleeve defining a large space between the filter sleeve and the second union nut.

LEO ANTHONY ZACKO.

REFERENCES CITED

The following references are of record in the file of this patent:

UNITED STATES PATENTS

| Number | Name | Date |
|---|---|---|
| 682,250 | Glauber | Sept. 10, 1901 |
| 1,086,066 | McDonald | Feb. 3, 1914 |
| 2,375,646 | Grossi | May 8, 1945 |

FOREIGN PATENTS

| Number | Country | Date |
|---|---|---|
| 103,207 | Austria | Apr. 26, 1926 |